April 16, 1929.　　J. BLACKBURN　　1,709,558
PRESELECTOR
Filed July 16, 1928
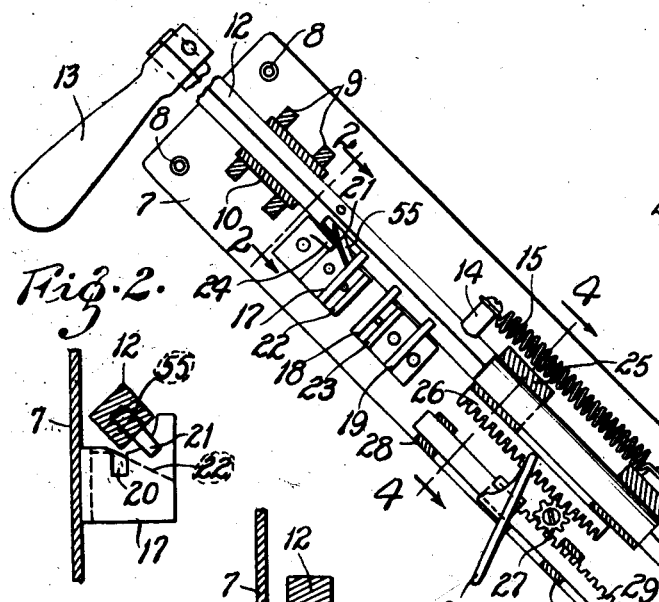
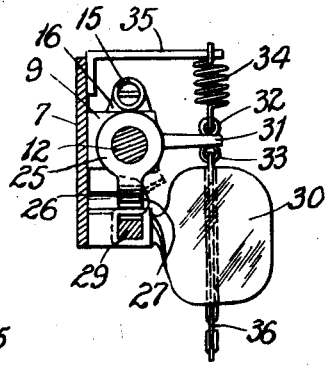
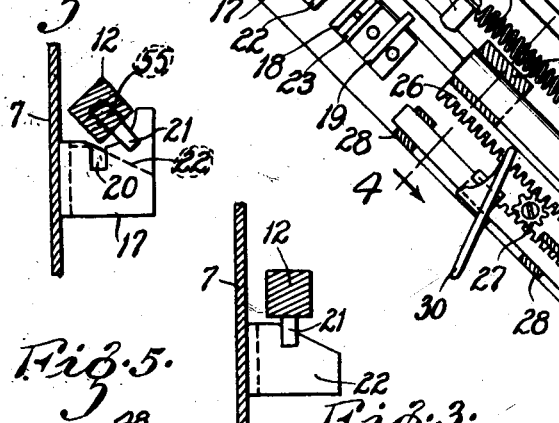
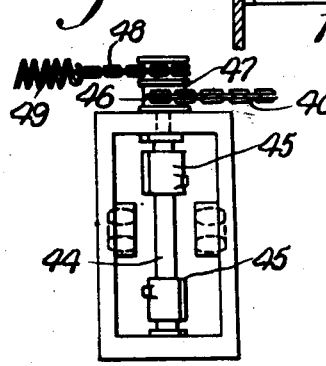
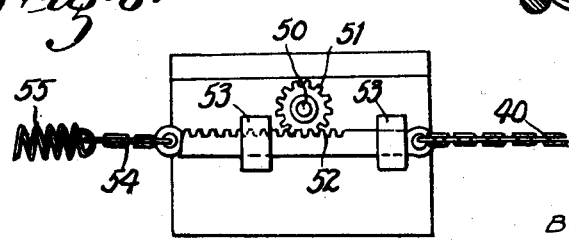
INVENTOR:
Jasper Blackburn
BY Edward E. Longan
ATTORNEY.

Patented Apr. 16, 1929.

1,709,558

UNITED STATES PATENT OFFICE.

JASPER BLACKBURN, OF WEBSTER GROVES, MISSOURI.

PRESELECTOR.

Application filed July 16, 1928. Serial No. 293,240.

My invention relates to improvements in preselectors, and has for its primary object a preselector for sliding gear transmissions in which low speed is first preselected and in which the preselector automatically preselects a next higher speed during the time that the first preselected gear is being shifted.

A further object is to construct a preselector which will automatically advance step by step thereby making preselections.

A still further object is to construct a preselector in which the preselections can be made either automatically or manually.

A still further object is to construct a preselecter which is located inside of a motor vehicle and which is designed to be used in connection with sliding gear transmission shifts in which the shifting is accomplished by the depression of the clutch pedal or similar actuating means so as to eliminate the usual shifter rod which projects upward in the center of the floor board.

In the drawings:

Fig. 1 is a side elevation of my device with parts broken away and in section.

Fig. 2 is an enlarged section taken on the line 2—2 of Fig. 1.

Fig. 3 is a similar view showing the selector rod after it has been rotated.

Fig. 4 is a section taken on the line 4—4 of Fig. 1.

Fig. 5 is a diagrammatic view of one form of connection between the transmission and the preselector; and Fig. 6 is an end view of another form of connection to a sliding gear transmission.

In the construction of my device I employ a plate or support 7 which is provided with openings 8 by means of which it can be attached within a motor vehicle, preferably to the side of the vehicle. Carried by the plate or support are brackets 9, which carry revoluble sleeves 10 and 11. The selector rod 12 is preferably rectangular in cross section and is provided at its upper end with a handle 13. The rod 12 is slidably mounted in the sleeves 10 and 11 and is provided with a boss 14 to which one end of a spring 15 is attached, the opposite end of the spring 15 is attached to a lug 16 which is carried by the plate or support 7.

Secured to the plate 7 are stops 17, 18 and 19. The stops 17 and 18 are provided with notches or cutaway portions 20 through which the dog 21 carried by the selector rod 12 is adapted to pass. Adjacent the stops 17 and 18 are auxiliary stops 22 and 23. These stops are cutaway as illustrated in Figs. 2 and 3. The purpose of these auxiliary stops will be explained in detail later.

Adjacent the stop 17 is a guide 24, the purpose of which is to cause the selector rod 12 to turn so that the dog 21 will be assured of abutting the plate or stop 17 as illustrated in Fig. 2.

Secured to the rod 12 is a sleeve 25 which has attached thereto a rack 26. This rack in turn meshes with a pinion 27 carried by the plate 7.

Secured to the plate 7 are guides 28 in which a rack is slidably mounted. This rack also meshes with the pinion 27. The rack 29 is provided with a foot plate 30 by means of which the rack 29 can be moved downward and in so doing it turns the pinion 27, which in turn imparts a reverse movement to the rack 26, thus moving the selector rod upward. By this construction the selector rod 12 can be moved upward either by grasping the handle 13 and pulling thereon or by depressing the foot plate 30.

Extending from the sleeve 11 is an arm 31, which is provided with eyes 32 and 33. Secured at one end in the eye 32 is a spring 34, the opposite end of which is secured to a bracket 35 carried by the plate 7. Secured in the eye 33 is one end of a chain or cable 36. This chain or cable passes around a sheave wheel 37, which is secured at some suitable point to the body of a motor vehicle. The opposite end of the chain or cable 36 is secured to a pedal 38. This pedal may be either a clutch pedal or it may be a separate pedal designed to operate a sliding gear transmission but since this invention does not relate specifically to any particular type of sliding gear transmission none has been shown, especially in view of the fact that my device is applicable to any kind of sliding gear transmission in which preselections can be made prior to shifting.

The lower end of the preselector rod 12 is provided with an eye 39 to which is attached one end of a chain or cable 40. This chain or cable passes around a sheave wheel 41, which is preferably carried by the lower end of the plate 7 although this is not essential since the wheel may be attached to the body of the vehicle.

The opposite end of the chain 40 is attached to a preselecting device 42 which may be in the form of a rotatable rod 42 around which a coil spring 43 is wrapped. This coil spring is designed to be placed under tension so as to rotate the rod or shaft 42 in the direction of the arrow as the selector rod 12 descends.

In Fig. 5 I have shown a modified form of construction in which a rotatable shaft 44 carries preselecting and shifting elements 45. The rod 44 has located thereon sheave wheels or spools 46 and 47. When this device is used one end of the chain 40 is attached to the spool 46 and to the spool 47 is attached a chain or cable 48 which is wrapped around the spool in a direction reverse to that of the chain or cable 40. The chain or cable 48 is provided on its end with a coil spring 49 which is adapted to be secured at its opposite end to a convenient point of a vehicle body so that as the selector rod 12 descends, this spring being under tension will cause the shaft 44 to rotate and wind up the chain 40 on the spool 46. Of course, an upward pull on the rod 12 will unwind the chain or cable 40 from the spool 46 and wind up the chain or cable 48 on the spool 47, placing the spring 49 under tension.

In Fig. 6 I have shown another modified form of construction in which the rotatable rod 50 corresponds to the rod 44 and also has preselecting and shifting elements located thereon similar to the elements 45. However, in place of mounting spools 46 and 47 on the rod 50 I mount thereon a pinion 51, which meshes with a rack 52 carried in guides 53. To one end of the rack 52 is attached the chain or cable 40 and to the opposite end a short chain or cable 54 to which in turn is attached a coil spring 55.

In this device upon pulling upward on the selector rod, the cable or chain 40 imparts a longitudinal movement to the rack which in turn rotates the shaft 50. This pulling or moving of the rack sets the coil spring 55 under tension. Then as the selector rod descends, the coil spring exerts its power and moves the rack in the reverse direction.

The operation of my device is as follows: Supposing the vehicle to be in neutral and it is desired to back out or to back the vehicle, the preselector rod 12 is moved upward to its fullest extent. This is either done by pressing down on the foot plate 30 or by pulling up on the handle 13. When in this position the dog 21 will be above the guide 24 and the preselection for reverse will have been made.

The pedal 38 in then depressed, which operates the shifting elements and shifts the transmission into reverse. During all of this time the selector rod has been held by the hand in its uppermost position. As soon as the shift into reverse has been made, the selector rod is released and the spring 15, which has been placed under tension, commences to contract, moving the selector rod 12 longitudinally and downward. As this rod moves downward, the dog 21 contacts with the guide 24 causing the rod to rotate so that the dog will come in contact with the plate or stop 17. This downward movement will cause slack to form in the chain or cable 40, which is connected to the preselecting and shifting elements and due to the coil spring, which exerts a pull or twisting movement on that part of the shifting element to which the chain or cable 40 is connected, this slack is taken up at and the same time selection is made for first speed forward.

After the vehicle has been backed the desired distance, the pedal 38 is again depressed, which will shift the transmission into low speed and simultaneously with this shifting the depression of the pedal 38 exerts a pull on the chain or cable 36 pulling down the arm 31 and rocking the preselector rod 12 to such a degree that the dog 21 can pass through the notch 20 in the plate 17.

As soon as the dog 21 passes through this notch it comes in contact with the auxiliary stop 22, which prevents the rod from moving farther. During this time, however, the shift has been completed and upon release of the pedal 38, the coil spring 34 contracts and pulls the rod so as to partially rotate it, which partial rotation will bring the dog so that it will clear the upper edge of the auxiliary stop and permit the spring 15 to further contract and draw the rod downward so that the dog 21 comes in contact with the stop 18, which completes preselection for the next highest speed.

Then upon shifting into this next highest speed, the foregoing operation is repeated, that is, the dog passes through a notch in the stop 18 and contacts with the auxiliary stop 23 and upon release of the pedal 38 the rod again rotates and the dog comes in contact with the stop 19, automatically preselecting the highest speed. The stop 19, however, is not provided with a cutaway portion or keyway since it is not desired to have the rod move downward any farther.

After the device has been shifted into high, a reverse longitudinal movement is imparted to the preselector rod 12 either by pressing down on the foot plate 30 or by pulling up on the handle 13 and upon the release of this handle or pressure on the foot plate, the device will again be set so as to preselect first or low speed forward.

Should this preselection to low speed be made and it is desired not to shift into low speed as in the case where a vehicle has stopped for a traffic signal, the operator can cause a longitudinal movement of the selector rod 12 either by turning the handle 13 with his hand or by pressing against the same with his knee so as to rotate the rod 12 sufficiently to permit the dog 21 to pass through the opening 20 in the plate 17. By this means, I am enabled to change the preselection at will and without operating the transmission or the pedal 38.

The dog 21 is preferably spring actuated so that it can readily pass into the slot 55 formed in the preselector rod when the reverse longitudinal movement is imparted to it either by pulling on the handle or pressing on the foot plate. In this way, it will not be necessary to impart any rotary movement to the selector rod when the same is moved upward but at the same time there will be no possibility of the selector rod moving downward unless it has been rotated.

The auxiliary stops 22 and 23 serve the purpose of preventing the selector rod 12 from moving downward too far or even possibly skipping a stop because in order for the dog to pass one of the auxiliary stops, it must be so rocked or rotated as to bring the dog 21 out of alignment with the opening formed in the stops 17 and 18.

It will, therefore, be seen that by my construction, although the selector rod may have a continuous upward movement, only a step by step downward movement can be obtained.

Having fully described my invention, what I claim is:—

1. A preselector comprising a support, a rotatable longitudinally sliding selector rod carried by said support, means for moving said rod longitudinally in one direction without hindrance, and means for causing said rod to automatically move longitudinally in the opposite direction step by step.

2. A preselector comprising a plate, brackets carried by said plate, a selector rod rotatably and slidably carried by said brackets, means for moving said rod in one direction, means for moving said rod in the opposite direction, a plurality of spaced apart means for limiting the movement of said rod in said last mentioned direction step by step, and means for rotating said rod so as to release the same from certain of said limiting means.

3. A preselector comprising a support, a rotatable longitudinally slidable selector rod carried by said support, means for moving said rod longitudinally in one direction without hindrance, and means including foot operated means for causing said rod to move longitudinally and automatically in the opposite direction step by step.

4. A preselector comprising a support, brackets carried by said support, a selector rod rotatably and slidably carried by said brackets, means for moving said rod in one direction, means for moving said rod in the opposite direction, a plurality of spaced apart means for limiting the movement of said rod in said last mentioned direction step by step, and foot operated means for rotating said rod so as to release the same from certain of said limiting means.

5. A preselector comprising a plate, a rotatable longitudinally sliding selector rod carried by said plate, foot operated means for moving said rod in one direction without hindrance, and means for causing said rod to move in the opposite direction step by step.

6. A preselector comprising a plate, brackets carried by said plate, a selector rod rotatably and slidably carried by said brackets, foot operated means for moving said rod in one direction, means for moving said rod in the opposite direction, a plurality of spaced apart means for limiting the movement of said rod in said last mentioned direction step by step, and means for rotating said rod so as to release the same from certain of said limiting means.

7. A preselector comprising a plate, a rotatable longitudinally sliding selector rod carried by said plate, means for moving said rod in one direction without hindrance, means for causing said rod to move in the opposite direction step by step, and flexible means carried by said rod and connected to the selecting elements of a sliding gear transmission for operating the same.

In testimony whereof I have affixed my signature.

JASPER BLACKBURN.